United States Patent [19]
Gose et al.

[11] Patent Number: 4,742,444
[45] Date of Patent: May 3, 1988

[54] METHOD OF OPTIMIZING DRIVE CONTROLS IN MACHINE TOOLS HAVING COMPUTER CONTROL

[75] Inventors: Horst Gose; Wolfgang Papiernik, both of Erlangen, Fed. Rep. of Germany

[73] Assignee: Siemens Aktiengesellschaft, Berlin and Munich, Fed. Rep. of Germany

[21] Appl. No.: 756,788

[22] Filed: Jul. 18, 1985

[30] Foreign Application Priority Data

Jul. 23, 1984 [DE] Fed. Rep. of Germany ....... 3427127

[51] Int. Cl.⁴ ............... G06F 15/46; G05B 15/02; G05B 19/417; G05D 3/12
[52] U.S. Cl. .................................. 364/157; 364/148
[58] Field of Search ............... 364/130, 148–154, 364/157–159, 167, 171, 176, 180, 188, 191, 192, 194; 318/561, 568, 590, 600

[56] References Cited

U.S. PATENT DOCUMENTS

| | | | |
|---|---|---|---|
| 3,532,862 | 10/1970 | Dahlin | 364/157 X |
| 3,727,035 | 4/1973 | Pemberton | 364/157 X |
| 4,054,780 | 10/1977 | Bartley et al. | 364/150 X |
| 4,214,301 | 7/1980 | Kurihara et al. | 318/561 X |
| 4,368,510 | 1/1983 | Anderson | 364/151 |
| 4,407,013 | 9/1983 | Arcara et al. | 364/149 |
| 4,432,439 | 2/1984 | Caputo et al. | 187/29 R |
| 4,441,151 | 4/1984 | Hayashibe | 364/157 |
| 4,578,747 | 3/1986 | Hideg et al. | 364/151 |
| 4,590,578 | 5/1986 | Barto, Jr. et al. | 364/167 X |
| 4,602,326 | 7/1986 | Kraus | 364/158 X |

Primary Examiner—Gary V. Harkcom
Attorney, Agent, or Firm—Kenyon & Kenyon

[57] ABSTRACT

A method of optimizing drive controls in a computer-controlled machine tool. The method comprises the steps of (a) ascertaining the system parameters of the drive control system from an open-loop system response, (b) computing the control parameters of a control system from the system parameters and a closed-loop target response, (c) simulating a closed-loop control system using the system and control parameters, (d) comparing the target response with a simulated response, (e) varying the control parameters in the simulated control system, (f) repeating steps (d) and (e) until the responses coincide and (g) setting the final control parameters into the control loop of the actual drive control system. The method steps are executed by means of the machine tool computer control.

3 Claims, 2 Drawing Sheets

METHOD OF OPTIMIZING DRIVE CONTROLS IN MACHINE TOOLS HAVING COMPUTER CONTROL

TECHNICAL FIELD

The invention relates to a method of optimizing drive controls in a computer-controlled apparatus such as a machine tool.

BACKGROUND OF THE INVENTION

Typically, the start-up operation of a numerically controlled machine tool includes the activation or start-up of control circuits of individual servo drives which form a part of the machine tool. An example of this is described in German Pat. No. 23 62 961. Problems arise, however, in trying to make the most effective use of (i.e., optimizing) the control parameters, such as, gain and adjustment time, of the drive control system as a whole according to the prescribed adjustment procedures of the individual controls. Such optimizing requires qualified service personnel to perform the adjustments which take a relatively long period of time because of the usual structure of cascaded control loops in a drive control system. More importantly, there cannot be complete assurance all the time that the optimum control parameters are actually set so as to make certain that the drive control system is optimally utilized statically and dynamically.

It is an object of the present invention to describe a method for the automatic optimization of drive controls and, thus, the drive control system.

It is a further object of the present invention to describe a method which uses any existing idle computing capacity of the overall machine tool control system for the start-up and automatic optimization of drive controls.

SUMMARY OF THE INVENTION

The foregoing problem of optimizing drive controls is solved by the present invention which is a method comprising the steps of:

(a) inputting a first reference input signal function into an open-loop configuration of the actual drive control system and ascertaining system parameters from a resultant system response;

(b) computing a second reference input signal function and control parameters from the system parameters and a desired target system response of a closed-loop configuration of the drive control system;

(c) simulating the closed-loop configuration of the drive control system by using the system parameters and the control parameters;

(d) inputting the second reference input signal function into the simulated drive control system and comparing a simulated system response with the desired target system response;

(e) varying the control parameters for reducing the deviation between the simulated system response and the desired target system response;

(f) repeating steps (d) and (e) until the simulated system response and the desired target system response coincide; and (g) setting the control parameters into a drive control feedback loop of the closed-loop configuration of the actual drive control system.

The second reference input signal function is then inputted into the actual drive control system and the actual system response is compared to the desired target response. If a deviation still exists, the control parameters can be optimized further by replacing the simulated control system with the actual closed-loop configuration and repeating steps (d) through (g) of the method. Simulation is no longer necessary since it can be assumed that the control parameters are already sufficiently close to the optimum so as to preclude an endangerment of the drive control system.

Advantageously, this method can use a weighting function, determined from the system response of step (a), to assist in simulating the closed-loop configuration of the drive control system. In lieu of the weighting function, a discrete difference equation could also be used for simulating the configuration and is calculated, for instance, by means of the method of least squares from the system response of step (a) where the first reference input signal function is a step function signal. The use of the equation yields a shorter computing time as compared to the use of the weighting function, and an associated convolution sum, but has the disadvantage that an assumption regarding the system order must be made a priori, which leads to approximations in many cases.

The above-described method steps are executed by the computer control of the machine tool and are completely automatic and program-controlled, so that the start-up operation and the optimization of the control parameters and control loops come about without any intervention on the part of the operating personnel. This leads to quite a considerable shortening of the starting-up time.

With the present conventional drive control system structure of cascaded control loops (position control with subordinated speed and current control), the individual control loops can then be optimized and set in operation independently of each other from the inside loop out, in accordance with the method steps described above. The procedure is identical here in principle for all control loops. Similar principles, however, can be applied also to drive control systems which are not constructed with individual subordinate control loops.

BRIEF DESCRIPTION OF THE DRAWINGS

For better understanding of the invention, reference is made to the following description of an exemplary embodiment thereof and the accompanying drawings therein.

DETAILED DESCRIPTION

Figure 1:
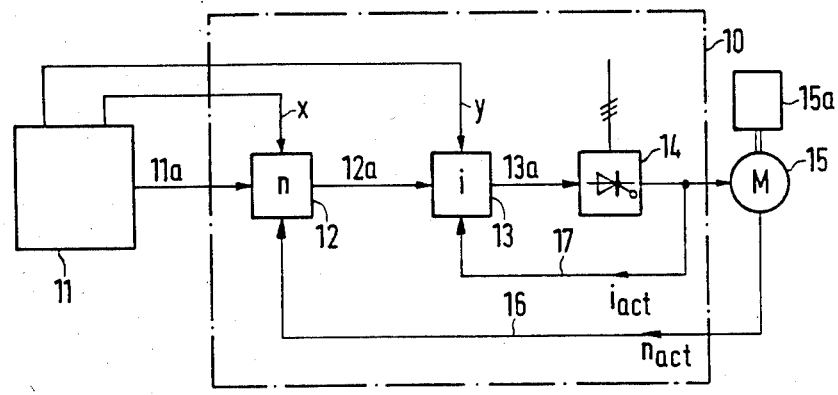
FIG. 1 is a schematic diagram of a typical machine tool drive control system having a closed-loop configuration.

As can be seen from FIG. 1, a typical machine tool drive control system 10 is associated with a known computer control 11 which directs the entire machine tool. The computer control 11 sends a speed instruction signal 11a to a speed controller 12 which, in turn, sends a current instruction signal 12a to a current controller 13, the two controllers 12,13 comprising the drive control system 10. For the sake of simplicity, a position controller, which typically forms part of the control system 10, is not shown since, as a rule, it is of digital design and usually part of the computer control 11. Note that it is advantageous in a system design to do the same with the speed controller 12 which is detailed in FIG. 1 only for the sake of clarity. The current controller 13 feeds a drive signal 13a to a converter 14 which translates the signal in order to drive a d-c motor 15. The motor 15 drives a movable workpiece, for instance, a feed slide 15a of the machine tool in one coordinate direction.

The actual speed value, $n_{act}$ and the actual current value, $i_{act}$ of the motor 15 are fed back to the controllers 12, 13 via respective control feedback loops 16, 17. The feedback values can then, for example, be inverted and mixed with the instruction signals 11a, 12a to remove any distortions enabling the actual motor performance to more closely resemble the desired programmed performance. The afore-described closed-loop configuration of a control system 10 is conventional and a well-known structure in machine tool control drives.

Figure 2:
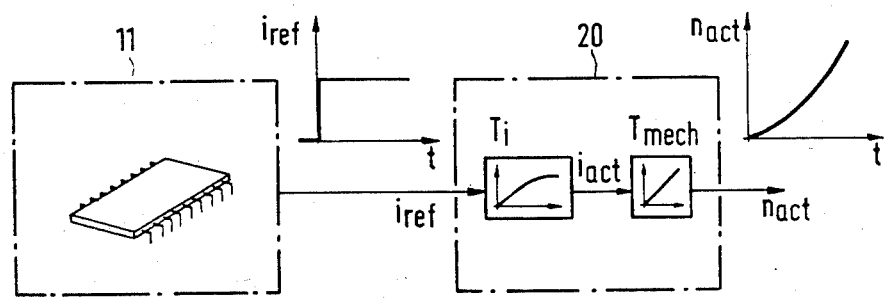
FIG. 2 is an equivalent circuit diagram of an open-loop configuration (no speed control feedback loop present) of the drive control system of FIG. 1.

FIG. 2 shows an equivalent circuit representation of an open-loop configuration 20 of the control system 10 (i.e., the speed control feedback loop 16 is not present). In the first step of the present invention, the computer control 11 instructs that a reference current input signal, $i_{ref}$ be inputted into the open-loop configuration 20 of the actual control system 10. Although depicted in FIG. 2 as a step function, the reference current input signal, $i_{ref}$ can be a differently shaped function. The equivalent circuit diagram includes the motor 15 and is characterized by the equivalent time constant, $T_i$ of the current control feedback loop 17 and the mechanical time constant, $T_{mech}$ of the motor drive 15. The actual speed value, $n_{act}$ of the motor 15 at the output is then received by the computer control 11 for determining the system parameters (i.e., $T_i$ and $T_{mech}$) of the drive control system 10. This is done in a known mathematical manner, illustrated by FIG. 3.

Figure 3:
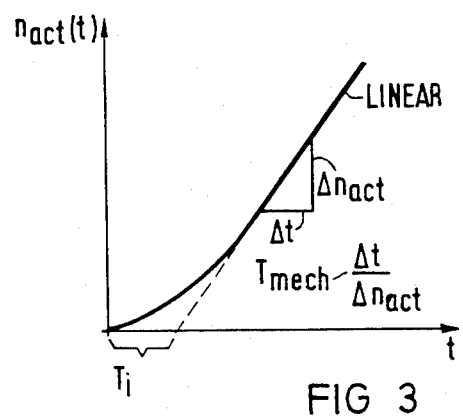
FIG. 3 is a graph of a speed response of the system of FIG. 2 to a step function current input and shows an exemplary method of determining system parameters of the drive control system of FIGS. 1 and 2.

In FIG. 3, the actual speed response, $n_{act}$ of the motor 15 is shown as a function of time. The linear portion of the response curve is used to determine the system parameters. The mechanical time constant, $T_{mech}$ is equivalent to the inverse of the slope of the linear portion of the response curve, i.e., $\Delta t / \Delta n_{act}$. The current control feedback loop time constant, $T_i$ corresponds to the X-intercept of the linear portion so extended, i.e., the value of t at $n_{act}(t) = 0$. These determinations are performed by the computer control 11 by using known mathematical algorithms.

Figure 4:
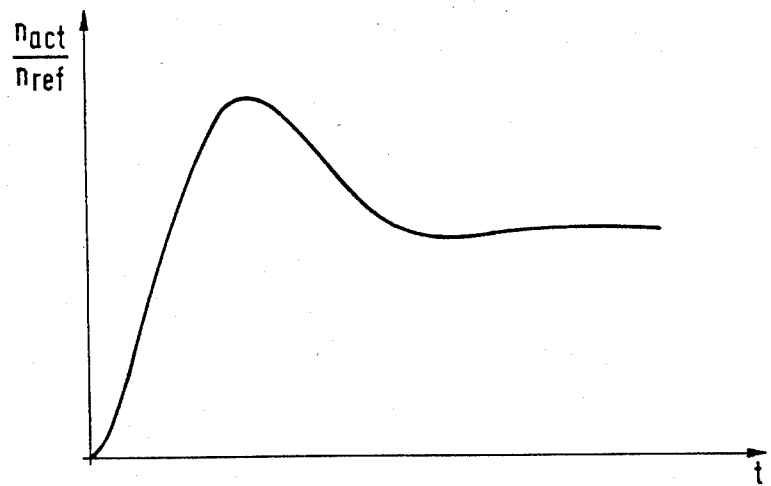
FIG. 4 is a desired target response of the closed-loop configuration of the drive control system in FIG. 1.

In the second step of the present invention, the computer control 11 uses a desired target system response, $n_{act}/n_{ref}$ of the closed-loop drive control system, such as the one shown in FIG. 4, and the previously calculated system parameters, $T_i$ and $T_{mech}$, to calculate a reference speed input signal, $n_{ref}$ compatible with the system parameters, and a suitable combination of control parameters for the closed-loop configuration. The control parameters can be determined, for instance, by means of double ratios. Double ratios are described in the review Regelungstechik 1978, Issue 12, pages 384–391.

Figure 5:
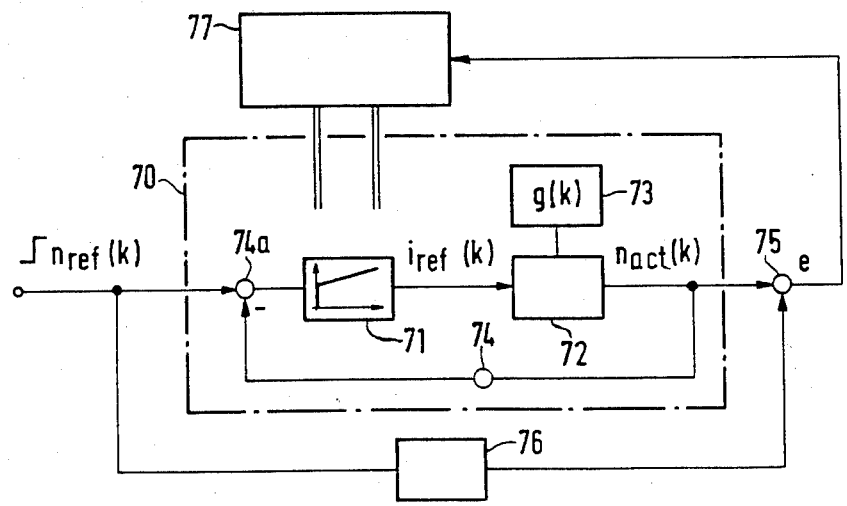
FIG. 5 is a schematic diagram of a simulated closed-loop configuration of the drive control system of FIG. 1.

In the third step, the computer control 11 uses the computed parameters of the first two steps and other available data to simulate the closed-loop configuration of the control system 10. FIG. 5 illustrates a simulated control system 70 which comprises a simulated speed controller 71, a simulation of the control system 10, expressed as a convolution sum 72 and a weighting function 73, and a simulated speed control feedback loop 74 which takes a speed output of the simulated system 70 and feeds it back to the simulated speed controller 71 via an inverting comparator 74a. The output is also fed to a comparator 75 which also receives a target function, stored within a table 76, upon activation by a simulated system speed input. The deviation, e between the target function and the simulated system 70 output is fed from the comparator 75 to a control setting 77 which varies the control parameters of the simulated speed controller 71 in a targeted manner.

It is known that the response of a linear system due to an arbitrary input can be calculated knowing only the nature of the system impulse response. The mathematical method of accomplishing this takes an arbitrary continuous function input, replaces it by a series of impulses displaced in time and calculates a system response to the sum of all the impulse inputs which is equivalent to the sum of the system responses to each impulse input acting separately (this is known as the superposition theorem for linear systems). Mathematically, the product of a system impulse response with each impulse input is summed over the time period needed to characterize the impulse response to yield the system response.

Thus, in the present invention, the drive control system 10 is simulated by using a convolution sum 72 and a weighting function 73. The weighting function 73 represents the continuous function input to the system 10 and is determined in accordance with the following relation:

$$g(k) \; n_{act}(k) - n_{act}(k-1),$$

where $n_{act}(k)$ is the simulated system speed output and k is the sampling time of the simulated control system 70. The convolution sum 72 determines the system 10 response and is obtained in accordance with the following formula:

$$n_{act}(k) = \sum_{v=o}^{k} i_{ref}(v) \cdot g(k - v)$$

where,
  $n_{act}(k)$ is the simulated system speed response;
  $i_{ref}(k)$ is the simulated speed controller 71 response;
  $g(k-v)$ is the continuous function input (i.e., the weighting function 73) represented as an impulse; and
  v is the time intervals of the impulses of the input.

The simulation with the convolution sum 72 and the weighting function 73 does not require any assumption regarding the design arrangement of the control system 10 and results in an almost exact simulation of the system. In addition, no unfavorable mechanical stresses are obtained for non-optimum control parameters. Simulation of the control system operation is faster than is possible in real time operation.

Thus, in the fourth step, the computer control 11 instructs that the reference speed input signal, $n_{ref}(k)$ previously calculated in step (2) of the method, be input into the simulated speed controller 71 which outputs a reference current signal, $i_{ref}(k)$. The reference current signal, $i_{ref}(k)$ is used as a system impulse response in the convolution sum 72 although its actual shape depends on the action of the simulated drive control. At the simulation output, the simulated system response, $n_{act}(k)$ is obtained and fed back via the simulated control loop 74 to the simulated speed controller 71. Note that when it is fed back, the response undergoes a feedback adjustment at the comparator 74a, where it becomes inverted and mixed with the incoming reference speed input signal, which is not inverted. The response, $n_{act}(k)$ also feeds into the comparator 75. The inputting of the reference speed input signal, $n_{ref}(k)$ activates the table 76 and the target system response, $n_{act}/n_{ref}$ which is stored therein feeds into the comparator 75. The comparator 75 then compares the simulated system response, $n_{act}(k)$ and the target system response, $n_{act}/n_{ref}$ and produces a deviation, e if any.

In the fifth step, the control setting 77 is signaled by the deviation, e to change the control parameters of the simulated speed controller 71 in such a manner as to reduce the deviation, e to as small a value as possible during the next simulation run. This is accomplished, for instance, by choosing an algorithm for use by the control setting 77 to compute the sum of the absolute values of the deviations, e in successive simulation runs and searching, via known search strategies such as vector procedures, for a minimum sum.

After each parameter variation, a new simulation run is then started until the responses coincide (Step 6). Finally, if the control parameters are determined by the computer control 11 to be sufficiently optimal, these parameter values are taken over by the computer control 11 into the actual control system 10, as indicated by lines x and y in FIG. 1 (Step 7). Subsequently, the computer control 11 will input the reference speed input signal, $n_{ref}$ into the actual control system 10 and compare the actual control system response, $n_{act}$ with the targeted system response, $n_{act}/n_{ref}$. If the actual control system response, $n_{act}$ is determined to be satisfactory, the optimization can be terminated therewith.

Should it be determined by the computer control 11 that the response, $n_{act}$ is not yet satisfactory, further optimization can take place with the aid of the actual control system. The use of the actual system 10 in lieu of the simulated system 70 is then possible because it may be assumed that the control parameters are already sufficiently close to an optimum so that danger to the actual system 10 can be precluded. By means of the actual system, the control parameters are varied in the aforedescribed method steps until an optimum is obtained.

Note, that the machine tool does not perform any task during the initial setting of the parameters (i.e., during the optimization process). If sufficient computing time/capacity is available, the drive control system 10 can be optimized later on, during operation of the machine tool.

Also note, that in systems with continuously changing parameters, such as, robots, reoptimiziation can take place continually by means of a difference equation of given order. In lieu of the weighting function and convolution sum, a discrete difference equation is used to simulate the control configuration. The illustration of processes (or control systems) via difference equations is explicitly described in a book R. Isermann, *Process Identification,* Springer Publishers, Berlin, Heidelberg, New York 1974. In the process, the difference equation must be adapted continually to the varying parameters, for instance, using the method of least squares.

It is to be understood that the embodiments described herein are merely illustrative of the principles of the invention. Various modifications may be made thereto by persons skilled in the art without departing from the spirit and scope of the invention.

What is claimed is:

1. A method of optimizing drive controls in machine tools having computer control, comprising the steps of:
   (a) inputting a first reference input signal function into an open-loop configuration of the actual drive control system and ascertaining system parameters from the resultant system response;
   (b) computing a second reference input signal function and control parameters from the system parameters of step (a) and a desired target system response of a closed-loop configuration of the drive control system;
   (c) simulating the closed-loop configuration of the drive control system by using the system parameters and the control parameters;
   (d) inputting the second reference input signal function into the simulated drive control system and comparing a simulated system response with the desired target system response;
   (e) varying the control parameters for reducing the deviation between the simulated system response and the desired target system response;
   (f) repeating steps (d) and (e) until the simulated system response and the desired target system response coincide;
   (g) setting the control parameters into a drive control feedback loop of the closed-loop configuration of the actual drive control system; and
   (h) inputting the second reference input signal function into the closed-loop configuration of the actual drive control system, comparing the actual drive control system response with the desired target system response, varying the control parameters for reducing the deviation therebetween to a predetermined amount, repeating the comparing and varying steps until the deviation therebetween reaches a predetermined amount, and setting the control parameters into the drive control feedback loop of the actual drive control system.

2. The method as set forth in claim 1, wherein simulating the closed-loop configuration of the drive control system further comprises characterizing an arbitrary continuous function input in terms of a weighting function and a simulated system response to said input in terms of a convolution summation using the system parameters of step (a).

3. The method as set forth in claim 1, wherein simulating the closed-loop configuration of the drive control system further comprises characterizing a simulated system response in terms of a difference equation of a given order, said order being determined from the resultant system response of step (a).

* * * * *